United States Patent [19]

Geery

[11] Patent Number: 5,207,088

[45] Date of Patent: May 4, 1993

[54] EXPANSION CHAMBER METHOD AND APPARATUS FOR ELIMINATING ACCURACY ERRORS WHEN TESTING GASEOUS FLOWMETERS

[75] Inventor: Paul W. Geery, Houston, Tex.

[73] Assignee: Dresser Industries, Inc., Dallas, Tex.

[21] Appl. No.: 685,589

[22] Filed: Apr. 11, 1991

[51] Int. Cl.$^5$ .............................................. G01F 25/00
[52] U.S. Cl. ................................................. 73/3
[58] Field of Search ............................................. 73/3

[56] References Cited

U.S. PATENT DOCUMENTS

| | | | |
|---|---|---|---|
| 3,813,920 | 6/1974 | Talkin et al. | 73/37 |
| 3,933,027 | 1/1976 | Mehall | 73/3 |
| 3,937,048 | 2/1976 | St. Clair et al. | 73/3 |
| 4,027,523 | 6/1977 | St. Clair | 73/3 |
| 4,063,449 | 12/1977 | Griggs | 73/3 X |
| 4,203,316 | 5/1980 | Jones | 73/3 |
| 4,306,457 | 12/1981 | Fukui et al. | 73/861.77 |
| 4,581,946 | 4/1986 | Kanayama | 73/861.77 |
| 4,658,634 | 4/1987 | Killough et al. | 73/3 |
| 4,685,324 | 8/1987 | Bourdon et al. | 73/3 |
| 4,758,408 | 7/1988 | Krawetz et al. | 73/19.01 X |
| 4,821,557 | 4/1989 | Beesom, III | 73/3 |
| 4,823,613 | 4/1989 | Cage et al. | 73/3 X |
| 4,831,866 | 5/1989 | Forkert et al. | 73/3 |
| 4,965,756 | 10/1990 | Pearman et al. | 364/571.01 |

Primary Examiner—Tom Noland

[57] ABSTRACT

A properly designed expansion chamber is mounted in a flowmeter test equipment configuration to quench or prevent pulsations from resonating the acoustic cavities in the configuration and, thereby, eliminate resonation errors in testing the accuracy of the flowmeter. The invention is particularly though not exclusively adapted to use with a testing configuration including a prover master meter and a conduit connecting the inlet of the prover master meter to the outlet of the gaseous flowmeter being tested. In the practice of the present invention, the pulsation frequencies can be quenched before the acoustic cavity within the conduit can be excited by introducing an expansion chamber at one or both ends of the conduit.

32 Claims, 2 Drawing Sheets

EXPANSION CHAMBER METHOD AND APPARATUS FOR ELIMINATING ACCURACY ERRORS WHEN TESTING GASEOUS FLOWMETERS

BACKGROUND OF THE INVENTION

This invention relates to methods and apparatus for testing gaseous flowmeters and, more particularly, it concerns an improved method and apparatus for eliminating accuracy errors caused by standing waves of sound encountered when testing gaseous flowmeters.

Public Utility Companies delivering natural gas to industrial complexes, factories, office buildings, hotels, apartments, hospitals, stores, homes, etc., are required to periodically verify the accuracy of the gas flowmeters used to bill the customers for the quantity of gas delivered.

Accuracy of the meters must be verified before being put in service and at specified intervals determined by the regulatory commissions of the states, cities, or local governmental authorities. A widely accepted method for testing is by the use of a portable transfer prover. This instrument system includes a very accurate "master meter" which is connected in series with the meter to be tested, so that a flow of air or natural gas may be transferred through both meters at various flow rates.

Portability of the proving system is important so that the transfer prover can be positioned near the installation site of the meter to be tested. Valves and fittings are normally provided so that the meter to be tested can be isolated from the gas line and a suitable pipe or flexible hose connection can be used to transfer the same gaseous flow through both meters in series. The volume readout of each meter can be compared after being corrected for temperature and pressure values of the flow through each meter. The accuracy determination is normally expressed as a percentage equivalent of the result indicated by the transfer prover master meter which has been calibrated to be 100% accurate at all flow rates.

The most accurate master meters are the positive displacement type. In this design the air or gas at the inlet of the meter is allowed to successively fill one cavity after another as they rotate to discharge each captured volume to the meter outlet. The cavities are rigid in shape and size, hence the name "positive displacement" meter.

A common form for this type of meter has two rotating impellers, each with two lobes which will produce four very small pulses in the air or gas stream for each complete revolution of the rotor assembly. Therefore, the frequency of the pulsations will be four times the revolutions per second of the meter impellers. When the displacement of the meter is known (cubic feet per revolution, CFR) and the flowrate is known (cubic feet per hour, CFH), the pulsation frequency can be easily determined:

$$\frac{CFH}{3600} = CF/\text{sec.} \div CFR = \text{Rev./Sec.} \times 4 = Hz$$

The impeller rotors in the positive displacement meters will appear at all times as a solid closure to a pressure wave-front travelling at the speed of sound in air or natural gas.

With reference to FIG. 1 of the drawings, if the inlet of a rotary positive displacement meter 10 is connected to a hose, tubing, or pipe 12 with the inlet to the tubing open to free space, the tube becomes a tuned one-quarter wavelength cavity. Such a cavity will resonate with sound waves at a fundamental frequency with a wavelength of four times the length of the cavity:

$$F = \frac{1130}{4(L + \Delta)}$$

1130 is the speed of sound in air, feet per second (or 1460 feet per second in natural gas)
L is the length of the cavity in feet
F is the frequency of the sound wave (Hz)
$\Delta$ is the pipe open end correction which is equal to $$\frac{4}{3} \times \frac{D}{\pi}$$

D is the pipe diameter in feet

When small pressure pulses occur at a rate which will resonate the cavity length, a standing wave sound will be sustained with a pressure node at the closed end and a velocity loop at the open end. This cavity will resonate only at "odd" harmonics of the fundamental frequency (3rd, 5th, 7th, etc.).

The true accuracy of the meter is not affected by these conditions, the problem lies in our inability to measure the true instantaneous pressure captured in each of the measuring chambers of the metering rotors. At or near resonant conditions, this pressure value will be different from the measured average flowing pressure which is normally used for pressure correction in test results. When the pressure correction is made with an incorrect pressure value, the accuracy of the test is also in error.

With reference to FIG. 2 of the drawings, if the inlet of a rotary positive displacement meter 14 is connected to a hose, tubing, or pipe 16 coupled to the outlet of another positive displacement meter 18, the tubing 16 is effectively closed at both ends for sound waves and becomes a tuned one-half wavelength cavity. Such a cavity will resonate with sound waves at a fundamental frequency with a wavelength of two times the length of the cavity:

$$F = \frac{1130}{2 \times L}$$

1130 is the speed of sound in air, feet per second (or 1460 feet per second in natural gas)
L is the length of the cavity in feet
F is the frequency of the sound wave (Hz)

When the small pressure pulses occur at a rate which will resonate this cavity length, a standing wave of sound will be sustained with pressure nodes at both "closed" ends. This cavity will resonate at all harmonics of the fundamental (2nd, 3rd, 4th, 5th, 6th, etc.).

With reference to FIG. 3 of the drawings, if the inlet of a rotary positive displacement meter 20 is connected to a hose, tubing, or pipe 22 coupled to the outlet of a turbine meter 24, the tubing 22 is effectively closed to sound waves only at the positive displacement meter and is open through the turbine meter which is transparent to the sound waves at the velocity loop of the standing wave. Hence, the tubing 22 is closed at one end and open at the other and becomes a tuned one-quarter wavelength cavity. This cavity will resonate with sound waves at a fundamental frequency with a wavelength of four times the length of the cavity:

$$F = \frac{1130}{4(L + \Delta)}$$

1130 is the speed of sound in air, feet per second (or 1460 feet per second in natural gas)
L is the length of the cavity in feet
F is the frequency of the sound wave (Hz)
$\Delta$ is the pipe open end correction which is equal to $$\frac{4}{3} \times \frac{D}{\pi}$$

D is the pipe diameter in feet

The resonant harmonic frequencies will be only the 3rd, 5th, 7th, etc. odd harmonics of the calculated fundamental.

In order to reach typical meter locations conveniently, the length of the hose or tubing required to interconnect the prover master meter with the meter to be tested will be 20 or 30 feet. This range of cavity length, when excited by the wide range of pulsation frequencies of a positive displacement meter, will combine to pass through many harmonic resonant points over the range of flow rates to be used for testing meter accuracy. As such, when gaseous flowmeters are tested for determining the metering accuracy over the full range of flow rates, acoustic resonance at certain flow rates prevents accurate test results from portions of the range of flow rates which are necessary to validate the true measuring accuracy of the device.

Although an experienced and skilled technician can sometimes audibly sense flow rate regions where acoustic resonance may be a problem and select other flow rates by trial and error to locate flow rates not producing acoustic resonance, this is not only time-consuming but leads to a lower confidence factor for the overall accuracy of the test.

In light of the foregoing, there is a need for an improved method and apparatus for testing gaseous flowmeters.

SUMMARY OF THE INVENTION

In accordance with the present invention, the problems associated with errors due to pulsations resonating acoustic cavities are substantially overcome by an improved apparatus and method providing an expansion chamber in the test configuration to quench or prevent the resonations.

The invention is particularly though not exclusively adapted to use with a testing configuration including a prover master meter and a section of hose or tubing connecting the prover master meter to the gaseous flowmeter being tested.

In the practice of the present invention, the pulsation frequencies can be quenched before the acoustic cavity can be excited by introducing an expansion chamber at one or both ends of the cavity.

Accordingly, a principal object of the present invention is to provide an improved method and apparatus for eliminating accuracy errors caused by standing waves of sound when testing gaseous flowmeters. Another and more specific object of the invention is the provision of an expansion chamber at one or both ends of the cavity interconnecting a prover master meter and the meter being tested. Other objects and further scope of applicability of the present invention will become apparent from the detailed description to follow taken in conjunction with the accompanying drawings in which like parts are designated by like reference characters.

DETAILED DESCRIPTION OF THE PREFERRED EMBODIMENTS

In accordance with the present invention, a properly designed expansion chamber is mounted in a flowmeter test equipment configuration to quench or prevent pulsations from resonating the acoustic cavities in the configuration and, thereby, eliminate resonation errors in testing the accuracy of the flowmeter.

Figure 4:
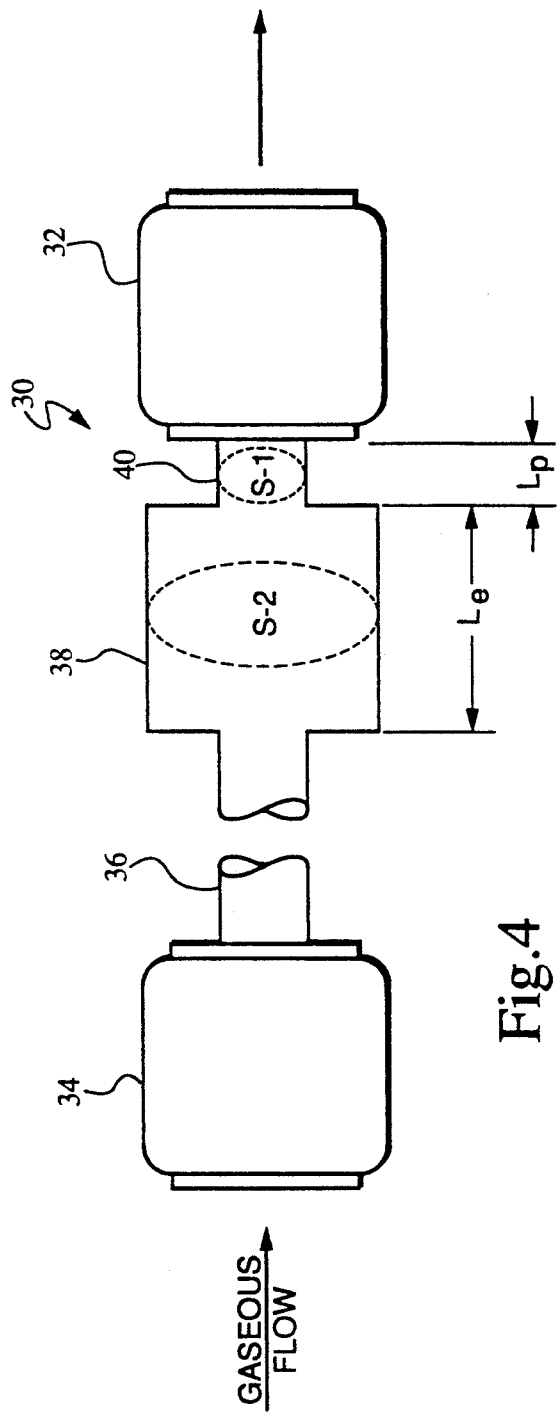
FIG. 4 is a schematic illustration of a testing configuration including an expansion chamber in accordance with one embodiment of the present invention.

In FIG. 4 of the drawings, an exemplary gaseous flowmeter testing configuration incorporating the expansion chamber of the present invention is generally designated by the reference numeral 30 and shown to include a rotary positive displacement master meter 32 connected to a rotary positive displacement meter 34 being tested via a pipe or tubing 36. An expansion chamber 38 is connected at its inlet to the tubing 36 and at its outlet to a short section of pipe or tubing 40 which in turn is connected to the inlet of the master meter 32.

The energy present in the sound pressure wavefront of meter pulsations is finite over the cross-sectional area of the pipe or tubing carrying the gaseous flow. If the cross-sectional area of the tubal cavity is abruptly increased to a value seven or more times as great, the energy per unit of area drops suddenly and is spread over a radially changing particle velocity, tending to destroy the uniform sound wavefront. The result is similar to the effect of the sound wave pressure front leaving the open end of pipe or tubing into the atmosphere, where the resonance would be lost.

With reference again to FIG. 4 of the drawings and in accordance with a preferred embodiment of the present invention, the cross-sectional area S-2 of the expansion chamber 38 should be seven or more times as great as the cross-sectional area S-1 of the tubing 40.

$$\frac{AREA\ S\text{-}2}{AREA\ S\text{-}1} \geq 7$$

The length of the expansion chamber 38 is required to provide maximum attenuation at the maximum driving frequency:

$$L_e = \frac{C}{4f}$$

where $L_e$ is length of the expansion chamber in feet, C is the velocity of sound in air 1130, or natural gas 1460 feet per second, and f is the frequency of pulsations. For the rotary positive displacement meter, the frequency is 4 times the maximum rotor revolutions per second ($4 \times Rmax$).

$$L_e = \frac{1130}{4 \times 4Rmax}$$

then, for air $L_e = \frac{70.6}{Rmax}$ ft.

and, for gas $L_e = \frac{91}{Rmax}$ ft.

The length $L_p$ of the passage 40 from the rotating positive displacement elements of the meter, to the beginning of the expansion chamber $L_e$, must be kept short to ensure that no resonant amplification occurs in this pipe when driven by the positive displacement meter at its maximum rotational speed.

For the pipe length $L_p$, the meter end is effectively closed by the positive displacement rotors. The end connected to the expansion chamber 38 is open and the $L_p$ fundamental quarter-wavelength resonant frequency is given by:

$$F = \frac{C}{4(L_p + \Delta)} \text{ Hz}$$

where
C is the sonic velocity in the gas
$\Delta$ is the pipe end correction equal to $$\frac{4}{3} \times \frac{D}{\pi}$$

D being the pipe diameter in feet
The skirts of resonance extend from $$\frac{F}{\sqrt{2}} \text{ to } \sqrt{2} \times F,$$

therefore the resonant frequency F must be equal to or greater than $$4 \times \sqrt{2} \times Rmax \text{ (Rmax in revolutions per second)}$$

or:

$$\frac{C}{4(L_p + \Delta)} = 4 \times \sqrt{2} \times Rmax$$

then:

$$L_p \leq \left[ \frac{C}{16 \times \sqrt{2} \times Rmax} - \Delta \right] \text{ft.}$$

for air, C = 1130 and:

$$L_p \leq \left[ \frac{50}{Rmax} - \Delta \right] \text{ft.}$$

-continued
for natural gas, C = 1460 and:

$$L_p \leq \left[ \frac{64.7}{Rmax} - \Delta \right] \text{ft.}$$

$$\Delta = \frac{4}{3} \times \frac{D}{\pi} \text{ (D = pipe diameter in feet)}$$

The calculation for the length $L_p$, specifies the marginal limit for this value and a valuable safety margin will be achieved if the length is reduced as far as possible. Thus, it is preferred to use the shortest length that can be readily assembled below the calculated value to maximize the safety margin preventing tubing resonance.

For the larger industrial sized meters with capacities from 10,000 to 1,000,000 cubic feet per hour, portable equipment for testing on site is not practical. Meters of this size range will be tested at permanent installations in central meter shops maintained by the Utility company. At these installations, the expansion chamber usually takes the form of an acoustic filter to reduce interaction from any pulsation developed by either meter.

Figure 5:
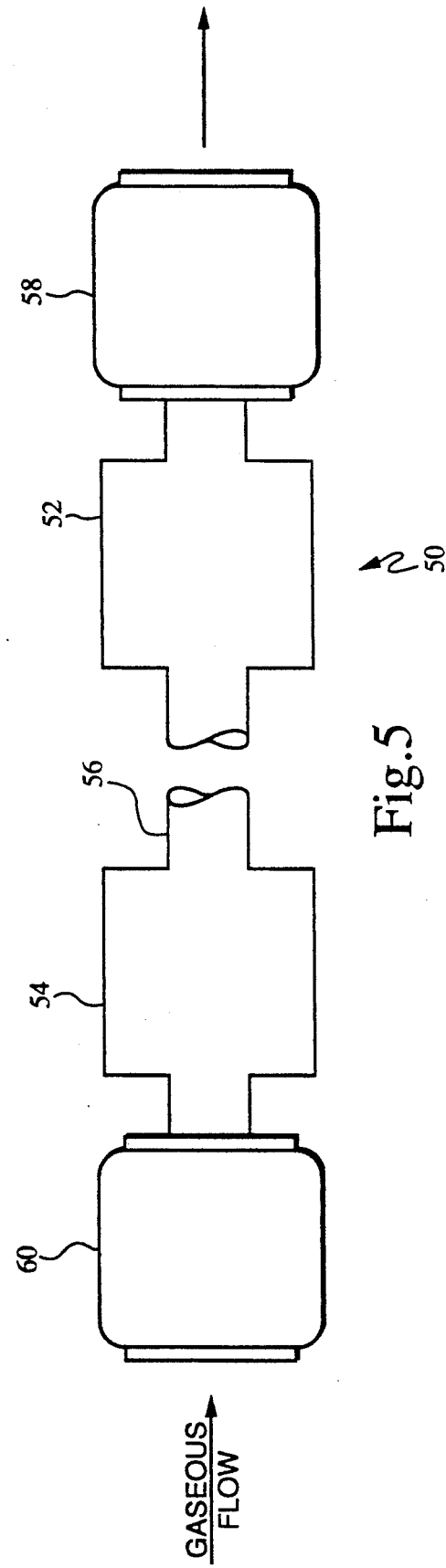
FIG. 5 is a schematic representation of a testing configuration including an expansion chamber at each end of a pipe interconnecting two meters in accordance with another embodiment of the present invention; and, FIG. 6 is a schematic illustration of a testing configuration for testing a turbine meter and including an expansion chamber in accordance with the present invention.

In FIG. 5 of the drawings, another embodiment of a flowmeter testing configuration in accordance with the present invention is generally designated by the reference numeral 50 and shown to include an expansion chamber 52 and 54 at each end of a section of tubing or pipe 56 interconnecting a positive displacement master meter 58 and a positive displacement meter 60 being tested.

An interesting demonstration can be performed with a typical 3-M, 5-M, 7-M etc., positive displacement rotary meter being tested by a transfer prover. The usual set-up will be with a length of hose coupling the master meter to the discharge flange of the meter under test. The normal recommendation is to leave the inlet flange of the meter under test, open to the atmosphere. The accuracy curve developed by several tests covering the flow range of the meter will show a reasonable fit to the manufacturers furnished data.

Next, a short length of pipe, for example approximately three feet, should be flanged-up to the inlet of the meter under test. An accuracy curve run under this condition will show a very severe sag of the accuracy curve in a flow rate region where the impellers of the meter under test are turning at approximately 23.4 revolutions per second (1400 RPM).

The cause of this test error is the resonance of the short length of pipe at the meter inlet. When the small meter pulsations occur at a frequency which is close to the resonant frequency of the inlet pipe length, a standing wave of sound is created in the pipe with the peak pressure located at the entrance to the meter measuring chambers. As a result, the meter rotors are capturing air volumes at a higher pressure than an average air pressure measurement would indicate. The higher pressure packets of air will allow the meter to run slower while discharging more volume to the master meter. If the meter under test runs slower than the rate indicated by the master meter, the test will run longer than it should (the revolutions of the meter under test determine the start and the end of the test) and the proof count will be greater for the test run. For pressure correction between the meters, the average pressure is normally used, but the true pressure of the measured volume at the meter under test is distinctly higher and is not available for proper pressure correction. When the greater than expected Corrected Proof count is converted to Corrected Accuracy, the value is lower than expected. The Accuracy curve will then exhibit a pronounced negative drop through the resonance region.

This experiment demonstrates the reason for recommending the length of air passage from the atmosphere to the inlet of the meter under test, should be very short so that the highest flow rate to be used, generates small pressure pulses too low in frequency to resonate the inlet passage, and normal average pressure measurements are accurate for the test.

When a turbine meter is to be tested with a rotary positive displacement master meter, attention should be paid to the tuned one-quarter wavelength tubular cavity which is now in place at the inlet to the master meter. The air path through the turbine body is never closed to sound frequencies and the prover hose length will be closed to sound frequencies at the master meter. The length of the resonant cavity extends from the inlet of the turbine body to the inlet of the master meter. This dimension is the length of the one-quarter wavelength tuned cavity for calculating the fundamental resonant frequency and the order of odd harmonics. At resonance frequencies there will be pressure pulses at the closed end and smooth air velocity changes (not pressure changes) at the open end into the atmosphere (the inlet of the turbine). The inertia of the turbine rotor is sufficient to prevent responding to even the lowest sound frequencies and will indicate a steady average flow rate. The resonant peaks of the air in one-quarter wavelength cavity will now affect the rotary positive master meter. The result will be slower than average rotations in the resonant flow rate regions, causing a lower Proof count at these test points. Of course, a low Proof count converts to a high Accuracy result. Therefore, at these resonant points, the accuracy curve will have positive error peaks.

The use of a long hose will produce a low frequency for the fundamental resonance and therefore closer spacing of the flow rates for the odd harmonic points, resulting in erroneous test points which are more closely spaced. Use of a much shorter hose will raise the fundamental frequency of the tuned cavity, and much greater spacing of the odd harmonic regions. The result will be a considerable increase in the valid flow rates that are acceptable to define a valid accuracy curve. An even better result can be achieved in accordance with the present invention by adding an expansion chamber between the hose and the inlet of the master meter.

Figure 1:
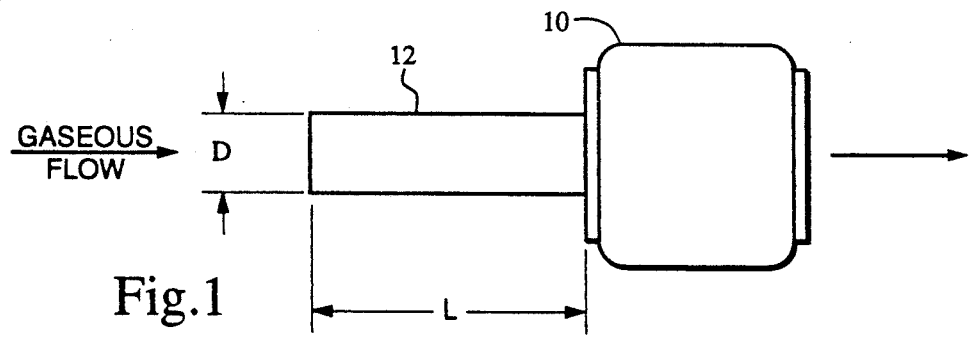
FIG. 1 is a schematic representation of a rotary positive displacement meter connected to a section of pipe.
Figure 2:
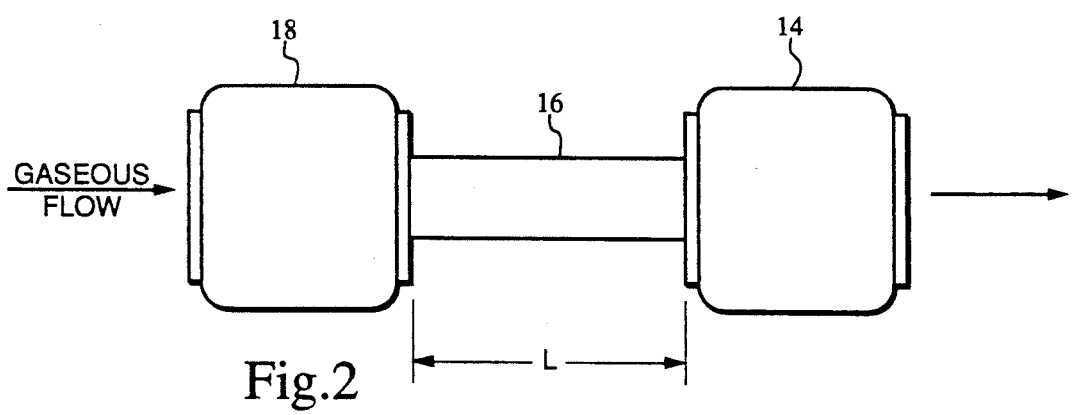
FIG. 2 is a schematic illustration of two positive displacement meters interconnected by a section of pipe.
Figure 3:
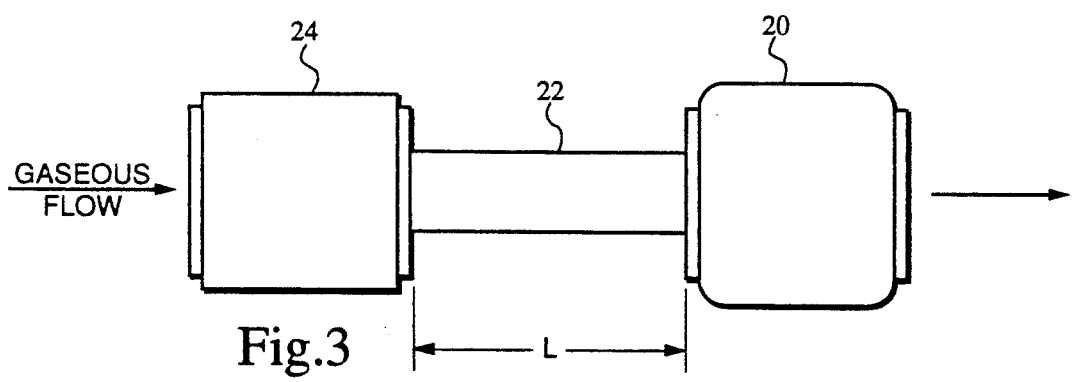
FIG. 3 is a schematic representation of a turbine meter connected to a positive displacement meter by a section of pipe.
Figure 6:
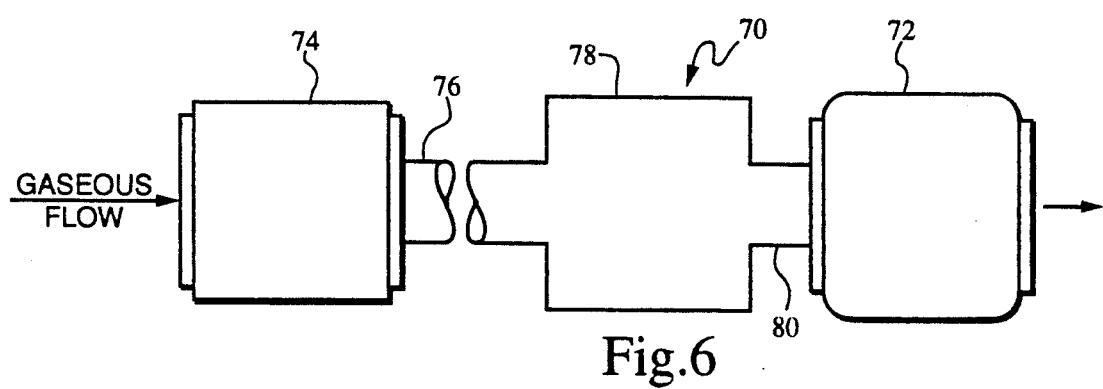

As shown in FIG. 6 of the drawings, a turbine meter testing configuration in accordance with the present invention is generally designated by the reference numeral 70 and includes a master meter 72 interconnected with a turbine meter 74 being tested by a hose 76. An expansion chamber 78 has an inlet connected to the hose 76 and an outlet connected to a short tube or pipe 80 which in turn is connected to the inlet of the master meter 72. The expansion chamber 78 serves to quench or prevent the error causing resonant peaks.

Thus it will be appreciated that as a result of the present invention, a highly effective testing error eliminating apparatus and method is provided by which the principal object and others are completely fulfilled. It is contemplated and will be apparent to those skilled in the art from th foregoing description and accompanying drawing illustrations that variations and/or modifications of the disclosed embodiment may be made without departure from the invention. Accordingly, it is expressly intended that the foregoing description and accompanying drawings are illustrative of a preferred embodiment only, not limiting, and that the true spirit and scope of the present invention be determined by reference to the appended claims.

What is claimed is:

1. In a method for testing the metering accuracy of a gaseous flowmeter, the improvement comprising:
   incorporating at least one expansion chamber in a testing configuration in order to eliminate accuracy errors caused by standing waves of sound and wherein the testing configuration includes a meter to be tested, a prover master meter, and a conduit providing fluid communication between said meters, and wherein said at least one expansion chamber comprises at least two expansion chambers, one being located adjacent an outlet of said meter being tested and the other being located near an inlet of said prover master meter.

2. The method of claim 1, wherein each of said expansion chambers has a cross-sectional area at least seven times as great as the cross-sectional area of said conduit.

3. The method of claim 1, wherein each of said expansion chambers has a length $L_e$ which provides maximum attenuation at the maximum driving frequency, and wherein $$L_e = \frac{C}{4f}$$

where $L_e$ is the length of the expansion chamber, C is the velocity of sound in the gas, and f is the frequency of pulsations.

4. The method of claim 1, wherein said meter being tested and said master meter are both positive displacement type meters.

5. The method of claim 1, wherein said meter being tested is a turbine type meter.

6. In a method for testing the metering accuracy of a gaseous flowmeter, the improvement comprising:
   incorporating at least one expansion chamber in a testing configuration in order to eliminate accuracy errors caused by standing waves of sound, said testing configuration including a meter to be tested, a prover master meter, and a conduit providing fluid communication between said meters, and wherein said at least one expansion chamber has a cross-sectional area which is at least seven times as great as the cross-sectional area of said conduit.

7. In a method for testing the metering accuracy of a gaseous flowmeter, the improvement comprising:
   incorporating at least one expansion chamber in a testing configuration in order to eliminate accuracy errors caused by standing waves of sound,
   said testing configuration including a meter to be tested, a prover master meter, and a conduit providing fluid communication between said meters, and said at least one expansion chamber being located near an inlet of said prover master meter and having a cross-sectional area at least seven times as great as the cross-sectional area of said conduit.

8. In a method for testing the metering accuracy of a gaseous flowmeter, the improvement comprising:
   incorporating at least one expansion chamber in a testing configuration in order to eliminate accuracy errors caused by standing waves of sound, and wherein said expansion chamber has a length $L_c$ which provides maximum attenuation at the maximum driving frequency, and wherein $$L_e = \frac{C}{4f}$$

where $L_c$ is the length of the expansion chamber, C is the velocity of sound in the gas, and f is the frequency of pulsations.

9. In a method for testing the metering accuracy of a gaseous flowmeter, the improvement comprising:
incorporating at least one expansion chamber in a testing configuration in order to eliminate accuracy errors caused by standing waves of sound, and wherein the testing configuration includes a meter to be tested, a prover master meter, and a conduit providing fluid communication between said meters, and wherein said at least one expansion chamber is located near an inlet of said prover master meter, and wherein said expansion chamber has a length $L_c$ which provides maximum attenuation at the maximum driving frequency, and wherein $$L_e = \frac{C}{4f}$$

where $L_c$ is the length of the expansion chamber, C is the velocity of sound in the gas, and f is the frequency of pulsations.

10. In a testing configuration for testing the metering accuracy of a gaseous flowmeter and wherein at least one meter in said configuration is a positive displacement type meter, the improvement comprising:
at least one expansion chamber introduced in said testing configuration in a position immediately upstream of said positive displacement type meter to eliminate accuracy errors caused by standing waves of sound.

11. The testing configuration of claim 10, wherein the testing configuration includes a meter to be tested, a power master meter which is a positive displacement type meter, and a conduit providing fluid communication between said meters, and wherein said at least one expansion chamber is located near an inlet of said prover master meter.

12. The testing configuration of claim 11, wherein said expansion chamber has a cross-sectional area at least seven times as great as the cross-sectional area of said conduit.

13. The testing configuration of claim 11, wherein the distance between an outlet of the expansion chamber and the inlet of said master meter is kept short to ensure that no resonant amplification occurs therein.

14. The testing configuration of claim 11, wherein said meter being tested and said master meter are both positive displacement type meters.

15. The testing configuration of claim 11, wherein said meter being tested is a turbine type meter.

16. The testing configuration of claim 10, wherein the testing configuration includes a meter to be tested, a prover master meter which is a positive displacement type meter, and a conduit providing fluid communication between said meters, and wherein said at least one expansion chamber has a cross-sectional area which is at least seven times as great as the cross-sectional area of said conduit.

17. The testing configuration of claim 10, wherein the distance between an outlet of the expansion chamber and an inlet of said positive displacement type meter is kept short to ensure that no resonant amplification occurs therein.

18. In a testing configuration for testing the metering accuracy of a gaseous flowmeter, the improvement comprising:
at least one expansion chamber introduced in said testing configuration in a position to eliminate accuracy errors caused by standing waves of sound, and wherein the testing configuration includes a meter to be tested, a prover master meter, and a conduit providing fluid communication between said meters, and wherein said at least one expansion chamber comprises at least two expansion chambers, one being located adjacent an outlet of said meter being tested and the other being located near an inlet of said prover master meter.

19. The testing configuration of claim 18, wherein each of said expansion chambers has a cross-sectional area at least seven times as great as the cross-sectional area of said conduit.

20. The testing configuration of claim 18, wherein each of said expansion chambers has a length $L_e$ which provides maximum attenuation at the maximum driving frequency, and wherein $$L_e = \frac{C}{4f}$$

where $L_e$ is the length of the expansion chamber, C is the velocity of sound in the gas, and f is the frequency of pulsations.

21. The testing configuration of claim 18, wherein said meter being tested and said master meter are both positive displacement type meters.

22. The testing configuration of claim 18, wherein said meter being tested is a turbine type meter.

23. In a testing configuration for testing the metering accuracy of a gaseous flowmeter, the improvement comprising:
at least one expansion chamber introduced in said testing configuration in a position to eliminate accuracy errors caused by standing waves of sound, and wherein said expansion chamber has a length $L_c$ which provides maximum attenuation at the maximum driving frequency, and wherein $$L_e = \frac{C}{4f}$$

where $L_c$ is the length of the expansion chamber, C is the velocity of sound in the gas, and f is the frequency of pulsations.

24. In a testing configuration for testing the metering accuracy of a gaseous flowmeter, the improvement comprising:
at least one expansion chamber introduced in said testing configuration in a position to eliminate accuracy errors caused by standing waves of sound, and wherein the testing configuration includes a meter to be tested, a prover master meter, and a conduit providing fluid communication between said meters, and wherein said at least one expansion chamber is located near an inlet of said prover master meter, and wherein asid expansion chamber has a length $L_c$ which provides maximum attenuation at the maximum driving frequency, and wherein $$L_e = \frac{C}{4f}$$

where $L_c$ is the length of the expansion chamber, C is the velocity of sound in the gas, and f is the frequency of pulsations.

25. An expansion chamber for use in a gaseous flowmeter testing configuration including a meter to be tested, a prover master meter and a conduit providing fluid communication between said meters, comprising:

an inlet, an outlet and an expansion chamber body therebetween, and wherein the cross-sectional area of said body is at least seven times as great as the cross-sectional area of said conduit, and wherein said expansion chamber has a length $L_c$ which provides maximum attenuation at the maximum driving frequency, and wherein $$L_e = \frac{C}{4f}$$

wherein $L_c$ is the length of the expansion chamber, C is the velocity of sound in the gas, and f is the frequency of pulsations.

26. The expansion chamber of claim 25, wherein the distance between the outlet of the expansion chamber and an inlet of said master meter is kept short to ensure that no resonant amplification occurs therein.

27. A testing configuration for testing the metering accuracy of gaseous flowmeter, comprising:

a meter being tested, a master meter, a conduit providing fluid communication between said meter being testing and said master meter, and at least one expansion chamber being located in a position to prevent standing waves of sound from reaching said master meter, said expansion chamber having a cross-sectional area at least seven times as great as the cross-sectional area of said conduit.

28. A testing configuration for testing the metering accuracy of gaseous flowmeters, comprising:

a meter being tested, a master meter, a conduit providing fluid communication between said meter being tested and said master meter, and at least one expansion chamber being located in a position to prevent standing waves of sound from reaching said master meter, and wherein said expansion chamber has a cross-sectional area at least seven times as great as the cross-sectional area of said conduit, and wherein said expansion chamber has a length $L_c$ which provides maximum attenuation at the maximum driving frequency, and wherein $$L_e = \frac{C}{4f}$$

wherein $L_c$ is the length of the expansion chamber, C is the velocity of sound in the gas, and f is the frequency of pulsations.

29. The testing configuration of claim 28, wherein the distance between an outlet of the expansion chamber and the inlet of said master meter is kept short to ensure that no resonant amplification occurs therein.

30. The testing configuration of claim 29, wherein said meter being tested and said master meter are both positive displacement type meters.

31. The testing configuration of claim 30, wherein said meter being tested is a turbine type meter.

32. A testing configuration for testing the metering accuracy of gaseous flowmeters, comprising:

a meter being tested, a master meter, a conduit providing fluid communication between said meter being tested and said master meter, and at least one expansion chamber being located in a position to prevent standing waves of sound from reaching said master meter, wherein said at least one expansion chamber comprises at least two expansion chambers, one being located adjacent an outlet of said meter being tested and the other being located near an inlet of said master meter.

* * * * *